(12) United States Patent
Wernersson

(10) Patent No.: US 8,115,860 B2
(45) Date of Patent: Feb. 14, 2012

(54) LED FLASH CONTROL

(75) Inventor: Mats Wernersson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 248 days.

(21) Appl. No.: 11/815,404

(22) PCT Filed: Feb. 3, 2006

(86) PCT No.: PCT/EP2006/000959
§ 371 (c)(1),
(2), (4) Date: Mar. 11, 2008

(87) PCT Pub. No.: WO2006/082075
PCT Pub. Date: Aug. 10, 2006

(65) Prior Publication Data
US 2009/0091652 A1    Apr. 9, 2009

Related U.S. Application Data

(60) Provisional application No. 60/651,812, filed on Feb. 10, 2005.

(30) Foreign Application Priority Data

Feb. 3, 2005    (EP) .................................. 05002277

(51) Int. Cl.
*H04N 5/222* (2006.01)
*G03B 9/70* (2006.01)
*G03B 15/02* (2006.01)

(52) U.S. Cl. .......................... 348/371; 348/370; 396/180
(58) Field of Classification Search ............... 348/229.1, 348/296, 297, 362, 364, 366, 370–1; 396/157, 396/180
See application file for complete search history.

(56) References Cited

U.S. PATENT DOCUMENTS

| | | | |
|---|---|---|---|
| 6,069,659 A | 5/2000 | Nakajima | |
| 6,278,490 B1* | 8/2001 | Fukuda et al. | 348/362 |
| 7,414,662 B2* | 8/2008 | Butterworth | 348/340 |
| 2002/0158976 A1* | 10/2002 | Vni et al. | 348/243 |
| 2003/0107658 A1* | 6/2003 | Huang et al. | 348/221.1 |
| 2003/0117491 A1* | 6/2003 | Avni et al. | 348/77 |
| 2004/0135923 A1 | 7/2004 | Kato | |
| 2004/0223075 A1* | 11/2004 | Furlan et al. | 348/363 |
| 2005/0195319 A1* | 9/2005 | Poplin | 348/371 |
| 2006/0184039 A1* | 8/2006 | Avni et al. | 600/476 |

FOREIGN PATENT DOCUMENTS

EP    0 949 809    10/1999
JP    2003-043549 A    2/2003

OTHER PUBLICATIONS

IPER for PCT/EP2006/000959; Mar. 28, 2006.

* cited by examiner

*Primary Examiner* — Daniel M Pasiewicz
(74) *Attorney, Agent, or Firm* — Myers Bigel Sibley & Sajovec

(57) ABSTRACT

An image recording apparatus with a solid state light emitting device is provided that controls one or more exposure settings for an image recording in low light conditions in response to a level of light reflected from a scene illuminated with the solid state light emitting device.

23 Claims, 3 Drawing Sheets

LED FLASH CONTROL

RELATED APPLICATIONS

The present application is a 35 U.S.C. §371 national phase application of PCT International Application No. PCT/EP2006/000959, having an international filing date of Feb. 3, 2006 and claiming priority to European Patent Application No. 05002277.1, filed Feb. 3, 2005 and U.S. Provisional Application No. 60/651,812 filed Feb. 10, 2005, the disclosures of which are incorporated herein by reference in their entireties. The above PCT International Application was published in the English language and has International Publication No. WO 2006/082075.

TECHNICAL FIELD OF THE INVENTION

The present invention relates to an image recording apparatus and in particular to a digital image recording apparatus for use with or within an electronic equipment for wireless communication.

DESCRIPTION OF RELATED ART

An increasing number of currently available electronic equipment for wireless communication like e.g. portable radio communication equipment such as mobile telephones, pagers, or communicators like for instance electronic organisers, smartphones, PDA's (Personal Digital Assistant) or other wireless communication appliances alike, is equipped with a digital camera module for taking pictures. These cameras are often used in low light situations where their sensitivity is not high enough to render viewable pictures.

The miniaturisation requirement for electronic equipment for wireless communication does not allow as much space for built-in equipment as stand-alone cameras do. Ultra-compact light sources offering a high level light output are required instead. Currently, solid state light sources like e.g. LED (Light Emitting Diode) flashes combining a small form factor with a high lumen output are the preferred choice.

But the efficiency of these solid state light emitting devices with respect to the conversion of electrical energy into light energy is with currently about 20% when used in flash mode very poor. Around four fifth of the input energy is dissipated.

A common camera module needs to take several image samples from the scene to adjust the exposure level for a final picture. FIG. 1 shows a representation of the respective image sampling according to a prior art exposure setting determination when taking a picture in a low light situation. All frames, i.e. individual shots or images, respectively, have been sampled while a solid state light emitting device illuminated the scene selected for being captured in the picture. The scene is illuminated with the same luminous flux for all frames, so that the exposure settings to be determined are those affecting the conversion of the image in the image sensor, i.e. the sampling parameters of the image sensor. The settings that defect the exposure in a digital camera are the integration time (or exposure time, equivalent to a camera shutter), the gain (or the amplification of the signal, which is equivalent to film speed) and/or the iris (or lense aperture, which is equivalent to iris or f-stop). It will be noted that most mobile phone cameras have a fixed iris, although there are some cameras having adjustable irises. The setting of the correct exposure can thus include one, two or three of the above parameters in any combination. The term 'sensor gain' is used in the context of this specification to describe the gain of electrical amplification of the voltage convert from the accumulated charge caused by the photoelectric effect in a pixel of an image sensor.

In the example of FIG. 1, the correct exposure settings are achieved for the fourth frame. After sampling the first image, i.e. frame 1, the picture obtained is analysed for the distribution and cumulative percentage of its individual pixel values. The result of this analysis is then used to calculate new exposure settings. A second frame is sampled and analysed to obtain new exposure settings. If the new exposure settings differ from the previous ones, the process is continued, else, the picture is recorded.

The illumination of the solid state light emitting device has to be kept at a high level for all frames to achieve a large illumination range. As the time period for which the flash light has to be lit covers a number of frames, the solid state light emitting device forming the flash typically has to be operated three to eight times longer than would be necessary for illuminating the scene only for the final picture recording. The already high energy losses in the solid state light emitting device are therefore multiplied with the conventional exposure setting determination straining the limited power resources available on an electronic device for wireless communication excessively.

The high heat dissipation connected with the multiplied power consumption forms a major challenge for the design of a powerful solid state camera flash with small overall dimensions and as a further consequence also limits the maximum illuminance achievable with the solid state light emitter.

It is therefore an object of the present invention to provide an image recording apparatus for use in electronic equipment for wireless communication with a solid state flash control that enables an operation of the solid state light emitting device in flash mode with a reduced energy consumption.

SUMMARY

This object is achieved by the invention as defined in the independent claims. Further developments of the invention are the subject of dependent claims.

The invention comprises an image recording apparatus with an image sensor for converting an optical image into image data depending on image sensor sampling parameters, a solid state light emitting device for illuminating a scene being the subject of the optical image, and a photoelectric converter for converting light reflected from the scene into a reflected light level signal that is indicative of the reflected light intensity. The image recording apparatus further comprises an exposure control circuit for controlling one or more exposure settings required for recording an image with the image sensor, whereby the one or more exposure settings comprise at least an illumination setting that defines a luminous flux to be emitted by the solid state light emitting device, and a drive circuit for driving the solid state light emitting device in accordance to the illumination setting provided by the exposure control circuit. The exposure control circuit is hereby adapted to control one ore more exposure settings required for recording an image with the image sensor (46) based on the reflected light level signal.

The present invention also comprises an electronic equipment for wireless communication with an image recording apparatus according to the respective independent claim or according to a respective dependent claim.

The invention further comprises a method for adjusting one or more exposure settings for an image recording apparatus having an image sensor for converting an optical image into image data depending on image sensor sampling parameters and a solid state light emitting device for illuminating a scene being the subject of the optical image. The one or more exposure settings comprise at least an illumination setting that defines the luminous flux to be emitted by the solid state light emitting device. According to this method, the scene is illuminated with light from the solid state light emitting device and a value indicating the intensity of light reflected from the scene is determined. One or more exposure settings required for recording an image with the image sensor are then adjusted based on the determined value indicating the intensity of light reflected from the scene.

The invention still further comprises a computer program product for an image recording apparatus as claimed in the respective independent and dependent claims, whereby the computer program product is adapted, when loaded into a memory and processed by a data processing means of the image recording apparatus (40) to perform thereon a method according to one of the respective method claims.

It should be noted that the terms 'comprises' and 'comprising' when used in this specification are taken to specify the presence of stated features, integers, steps or components, but do not preclude the presence or addition of one or more other features, integers, steps, components or groups thereof. Further it is to be noted that the terms 'image recording' or 'recording an image' refer to the recording of a picture on a frame basis (individual pictures), which is characterised by a capturing of a single image with an image sensor based on the photoelectric effect causing an accumulation of charges in the individual photosensitive elements (pixels) of the image sensor according to the respective local incident light intensity, followed by a conversion of each pixel charge into a digital value and a recording of the obtained values in an image file. If the creation of an image file is not mandatory, the terms 'image sampling' or 'sampling of an image' are used instead. An 'exposure' in photographic terms is the intensity of light and the time the light is allowed to act on an image sensor of an image recording apparatus. But within this specification the term 'exposure' will also be used as a synonym for taking an image. An exposure is controlled by 'exposure settings' like for instance the image sensor gain, the exposure time and the ambient light, which in low light situation is replaced by the illumination setting controlling the scene illumination with the solid state light emitting device. In low light situations, the exposure settings controlling the image recording are given by the image sensor sampling parameters, which control the process of accumulating charge induced by the photoelectric effect in the individual pixels of the image sensor, converting the charge to a voltage and setting the gain of amplification of the voltage, and by the illumination setting controlling the illuminance of the solid state light emitting device used to light the scene selected for the shot.

The present invention enables a control of the lumen output from the solid state light emitting device such that either the intensity of light reflected from the scene is kept constant to spare the sampling of images required for an adjustment of image sensor sampling parameters like e.g. gain and exposure time, or enables to operate the solid state light emitting device with a defined light emission produced with optimised efficiency.

The adjustment of the one or more exposure settings is preferably controlled by the exposure control circuit such that the illumination setting is adjusted based on a comparison of the reflected light level signal with a reference signal that depends on pre-set image sensor sampling parameters and/or such that the image sensor sampling parameters are adjusted based on the value of the reflected light level signal obtained for driving the solid state light emitting device in correspondence to a pre-set illumination setting.

According to an advantageous embodiment, a synchronisation circuit is provided that enables a control of a light emission from the solid state light emitting device in synchronisation with one or more sampling states of the image sensor. Sampling state hereby means a discernible state in the progress of an image sampling. A respective synchronisation allows to limit the light emission from the solid state light emission device to just the time interval required for recording an image or picture, respectively.

The synchronisation circuit hereby advantageously limits the light emission from the solid state light emitting device to a time period required for the sampling of one image frame to be recorded. In an alternative embodiment, the emission from the solid state light emitting device during an image recording is preferably only effected within a time span characterised by all of the image sensing elements of the image sensor being in sampling mode. This allows to reduce the illumination time below the image sampling time. As this time period is very short, the solid state light emission device can be operated with a higher injection current than would be possible for the total time required for an image sampling, which yields a higher luminous efficiency resulting in an additionally increased light output at a reduced heat dissipation.

According to a further advantageous embodiment of the present invention, the exposure control is adapted to determine an exposure setting at a time interval where the solid state light emitting device is driven to emit light prior to an image recording. The scene illumination condition can thus be tested prior to taking a shot ensuring correct exposure settings right from the beginning of an image sampling process combined with a reduced red-eye effect.

The photoelectric converter advantageously comprises a photodiode and/or a phototransistor and/or photoresistor, as these semiconductor devices show a compact form factor combined with a short response time. The solid state light emitting device is preferably formed by a light emitting diode (LED) combining a small form factor with a high illuminance.

To enable a simple adjustment of the reflected light level to a reference value, the exposure control circuit effectively comprises a comparator circuit for creating a signal, which forms the base for the illumination setting and which is based on the difference between the reflected light level signal and the reference signal.

By implementing the exposure control circuit in form of a logic circuit, an integration of the image recording apparatus into an electronic equipment for wireless communication is facilitated. The photoelectric converter comprises hereto preferably an analogue to digital converter for providing a digital reflected light level signal.

An electronic equipment for wireless communication comprising an image recording apparatus according to the present invention is preferably formed by a mobile radio terminal, so that a picture taken with the appliance can easily be sent using established messaging standards. The image recording apparatus may hereby be formed as a detachable accessory unit for the main body of the electronic equipment.

BRIEF DESCRIPTION OF THE DRAWINGS

In the following description, the present invention is explained in more detail with respect to special embodiments and in relation to the enclosed drawings, in which.

DETAILED DESCRIPTION OF EMBODIMENT

Figure 1:
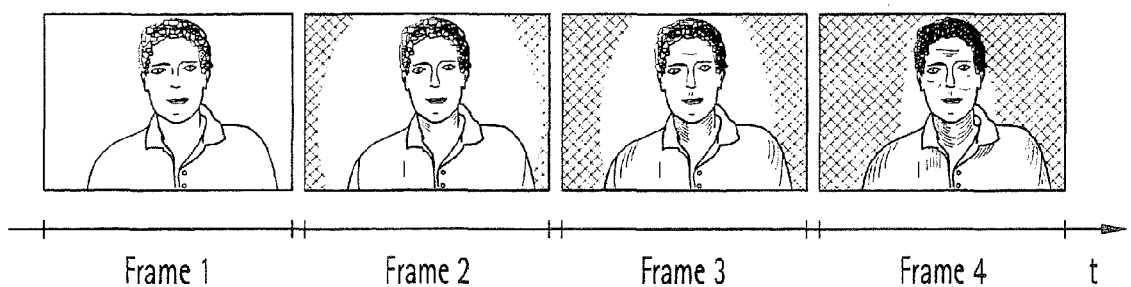
FIG. 1 shows several images being successively sampled by a common auto exposure mechanism using a solid state light emitting device for scene illumination.

The present invention makes use of the fact, that the image quality is, for a given set of exposure settings, a function of the total light reflected from the recorded scene. The exposure settings comprise an illumination setting controlling the luminous flux output from the scene illumination and the sampling parameters of the image sensor, controlling the conversion of an optical image projected onto the image sensor into image data. The sampling parameters of the image sensor are hereby directly correlated with the integral intensity level of light reflected, which corresponds to an average of the light intensities reflected from different parts of the scene. The most common sampling parameters of image sensors are currently sensor gain and exposure time. If the image sensor sampling parameters are already specified, the integral intensity of reflected light has to correspond to a reference light intensity. Vice versa, if the integral intensity of the reflected light is known, suited sampling parameters have to be selected correspondingly.

By adjusting the illumination intensity of the solid state light emitting device used as photo flash such that the integral value of light reflected from the selected scene corresponds to a reference value, the conventional auto exposure mechanism described above can be omitted. The powering-on of a solid state photo flash can thus be limited to the time interval required for the frame at which the image is actually recorded saving a considerable amount of energy.

A likewise effective power-on time reduction for a solid state photo flash is achieved by measuring the integral level of light reflected from the selected scene and using image sensor sampling parameters which are known to yield the required image quality for the light level measured. In order to avoid artefacts in a recorded image like e.g. under- or overexposure of initially exposed image areas, the reflected light level is preferably measured during a short pre-flash emitted from the solid state light emitting device prior to the actual image recording.

Solid state image sensors used in current digital camera modules are typically implemented in CCD (Charge Coupled Device) or CMOS (Complementary Metal Oxide Semiconductor) technology. Interline CCDs operate either in progressive scan or interlaced scan mode. During the exposure all CCD sensor elements accumulate charge at the same time when operated in progressive scan mode. In interlaced scan mode the even and odd rows of sensor elements accumulate the photoelectrically generated charges successively. CMOS image sensors can be operated in rolling shutter mode or in 'between frames extended exposure' mode. In the first mode, rows of sensor elements accumulate (integrate) the charge induced by the image of the selected scene on the image sensor sequentially, whereby a number of rows may be pooled. Also in the second mode, the rows integrate the photo-induced charge sequentially, but the integration intervals of the individual rows are arranged to overlap in a way that for a certain time span all of the image sensor elements accumulate photo-induced charge simultaneously.

Figure 2:
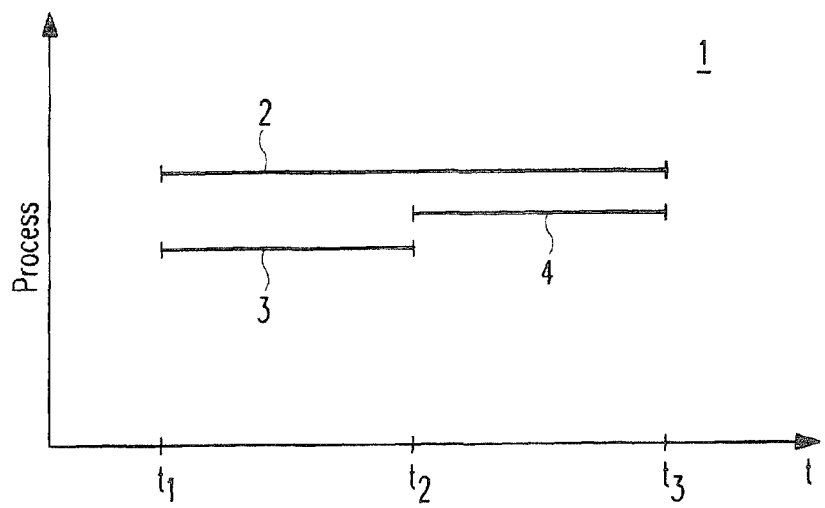
FIG. 2 shows the on-time of a solid state light emitting device with reference to the row integration times for an image sensor operated in rolling shutter mode.

The simplified example shown in diagram 1 of FIG. 2 relates the flash illumination period 2 required for recording an image e.g. with a CMOS image sensor operated in rolling shutter mode to sampling states of the image sensor defined by the limits of the integration intervals. The illumination period 2 starts at time $t_1$ with the beginning of the first row's integration interval 3 and ends at time $t_3$ with the end of the last row's integration interval 4. The integration intervals of intermediate pixel rows are omitted in the diagram for the sake of clarity. But the second integration interval is shown to start at the end of the first at time $t_2$ for illustrating that at least one pixel row is accumulating charge at any time of the exposure. It should be noted that the representation of FIG. 2 also applies for CCD image sensors operated in interlace scan mode, where the even pixel row integration interval 4 directly adjoins the odd pixel row integration interval 3.

Figure 3:
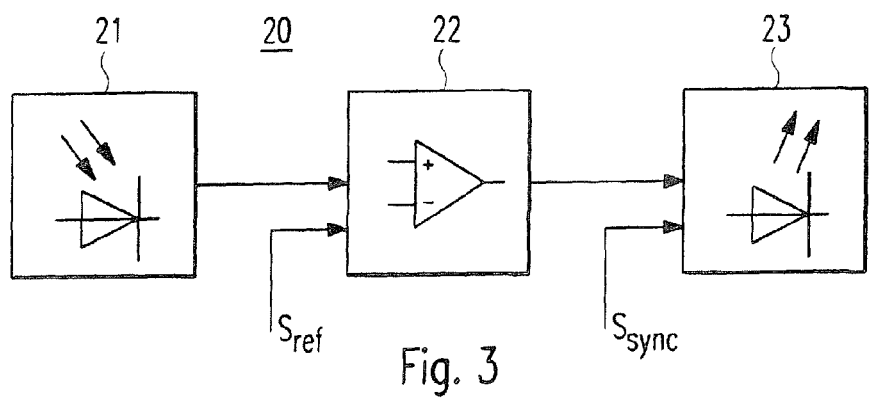
FIG. 3 shows a block diagram of a control circuit for a solid state photo flash control according to a first embodiment of the present invention.

The block diagram of FIG. 3 shows a control circuit 20 for a solid state photo flash of an image recording apparatus enabling the control of a flash illumination of a scene in a way that the integral intensity of light reflected from the scene into an area close to the lens of the camera module corresponds to a reference light intensity required for the currently used image sensor sampling parameters. The control circuit 20 comprises three main components, a photoelectric converter 21, an exposure control circuit 22, and photo flash 23 with a solid state light emitting device like for instance a LED providing a high luminous flux output. The photoelectric converter may be formed by any kind of photodetector able to convert light incident on it into an electric signal indicative of the light level received, like e.g. by a photodiode, a phototransistor or a photoresistor. The field of view of the photoelectric converter 21 is preferably aligned with the camera module's lens coverage enabling the photodetector 21 to receive light reflected from at least the main part of the scene to be captured in an integral way.

A synchronisation circuit (not shown) provides a synchronisation signal $S_{sync}$ for synchronising the emission of light from the solid state light emitting device of photo flash 23 with sampling states in the process of an image recording. The light emission starts with a defined initial luminous flux output at the beginning of an image sampling. Part of the light reflected from the scene is received by photodetector 21 and converted into an electric reflected light level signal, which is then supplied to the exposure control circuit 22. The reflected light level signal is checked there against a reference signal $S_{ref}$ for providing an illumination control signal based on a comparison of both signals. The illumination control signal represents an illumination setting defining a corrected luminous flux output from the photo flash 23 and is supplied for this purpose to the drive circuit for the solid state light emitting device. The drive circuit for driving the solid state light emitting device in accordance to the illumination setting provided by the exposure control 22 may be formed as part of photo flash 23 but alternatively also form an integral part of the exposure control 22 itself.

The corrected luminous flux output modifies the scene illumination affecting the intensity of reflected light received by photodetector 21 so that a feedback loop is created, which adapts the luminous flux outputted from photo flash 23 such that the reflected light intensity received by photodetector 21 meets the light level required for the pre-set image sensor sampling parameters. The result is a correctly exposed digital image recorded without delay as would be the case with the conventional auto exposure mechanism due to the multiple image sampling as explained further above with reference to FIG. 1. The photo flash 23 is only turned on with the beginning of the image sampling and is immediately turned off by the synchronisation circuit after the sampling ended thus saving a lot of power compared the conventional exposure adjustment. More over, the camera module of a respective image recording apparatus can be operated with predefined or even default sampling parameters, whereby in the first case the image sampling parameters can be adapted to motif characteristics, like the exposure time made short for capturing fast moving objects, while in the second case, the responsibility for the exposure settings is taken from the user.

The control circuit 20 can be implemented in analogue as well as in digital technology, but also a mixed version of analogue and digital technology is possible.

Figure 4:
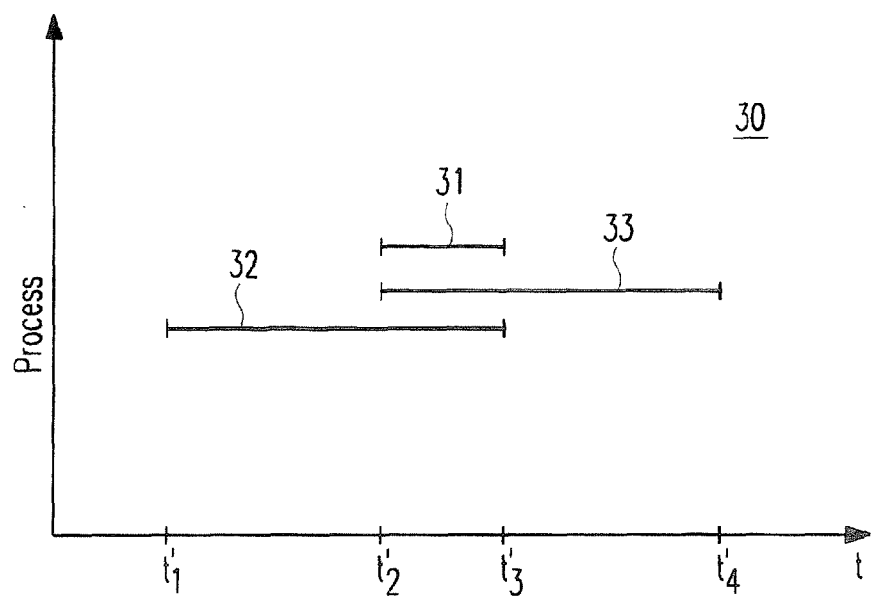
FIG. 4 shows the on-time of a solid state light emitting device with reference to the row integration times for an image sensor operated in "between frames extended exposure" mode.

When using an image recording apparatus with a CMOS image sensor of more recent design, advantage can be taken of the "between frames extended exposure" design for further reducing the time interval required to illuminate a scene being recorded. When a CMOS image sensor is operated in "between frames extended exposure" mode, the integration time intervals of all pixel rows overlap for a certain period 31. This is illustrated in diagram 30 of FIG. 4. The integration interval 32 of the first pixel row starts at time $t'_1$ and ends at time $t'_3$. The integration interval of the last pixel row 33 starts at a time $t'_2$ shorter than $t'_3$ and ends at time $t'_4$. In the time span 31 between $t'_2$ and $t'_3$ all image sensing elements of the image sensor are in sampling mode. According to a preferred embodiment of the present invention, the light emission from the photo flash is effected only within this time period 31, whereby the illumination period may be shorter or equal the time period 31. As this time period is very short, the solid state light emitting device can be driven with a higher injection current resulting in a higher illuminance as would be possible for longer periods. This increases the efficiency of the solid state photo flash even further.

Figure 5:
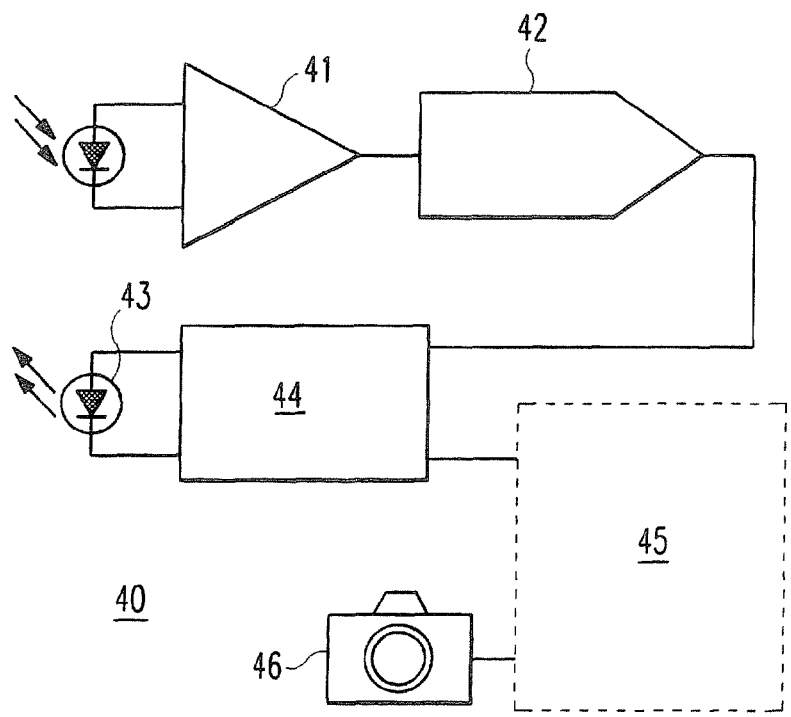
FIG. 5 shows a block diagram of a control circuit for a solid state photo flash control according to a further embodiment of the present invention.

In a further preferred embodiment of an image recording apparatus 40 according to the present invention, which is shown in FIG. 5, the image sensor sampling parameters are adjusted in response to the reflected light level received by the photoelectric converter or photodetector 41, respectively. The solid state light emitting device 43 is hereto driven to emit a flash light with a defined luminous flux. Both, the drive circuit for the solid state light emitting device and the control circuit for controlling the exposure settings can be combined into one functional block 44 as shown in FIG. 5. The camera control unit 45 synchronises the flash light emission with the various sampling states of the image sensor used in camera module 46.

The exposure control of functional block 44 is preferably implemented as a logic circuit, which requires that the electric reflected light level signal from the photodetector 41 is provided in digital form, a task handled by an analogue-to-digital converter, the AD-converter 42. During a flash light emission in response to an initiation of an image recording, the exposure control calculates the sampling parameters for the image sensor from the digital value of the light level received from photodetector 41 via AD-converter 42 and provides these values for the camera control unit 45, which controls the image sampling according to the calculated parameters.

The parameters are preferably calculated at a pre-flash illumination of the scene to be captured prior to the actual image recording process. The time interval required for the pre-flash can be very short compared to the illumination period required for the image sampling so that the total power consumption is practically not increased. Also a pre-flash used to reduce the red-eye-effect can be utilised for the purpose.

In addition to only calculating image sensor sampling parameters from the reflected light level, the calculation of the exposure settings may also include a calculation of a new illumination setting thus enabling a more versatile exposure control.

An image recording apparatus as described above is preferably used as part of an electronic equipment for wireless communication, particularly as part of a mobile radio terminal. The image recording apparatus may hereby form an integral part of the equipment but may also be formed as a detachable accessory unit for the main body of the equipment.

Figure 6:
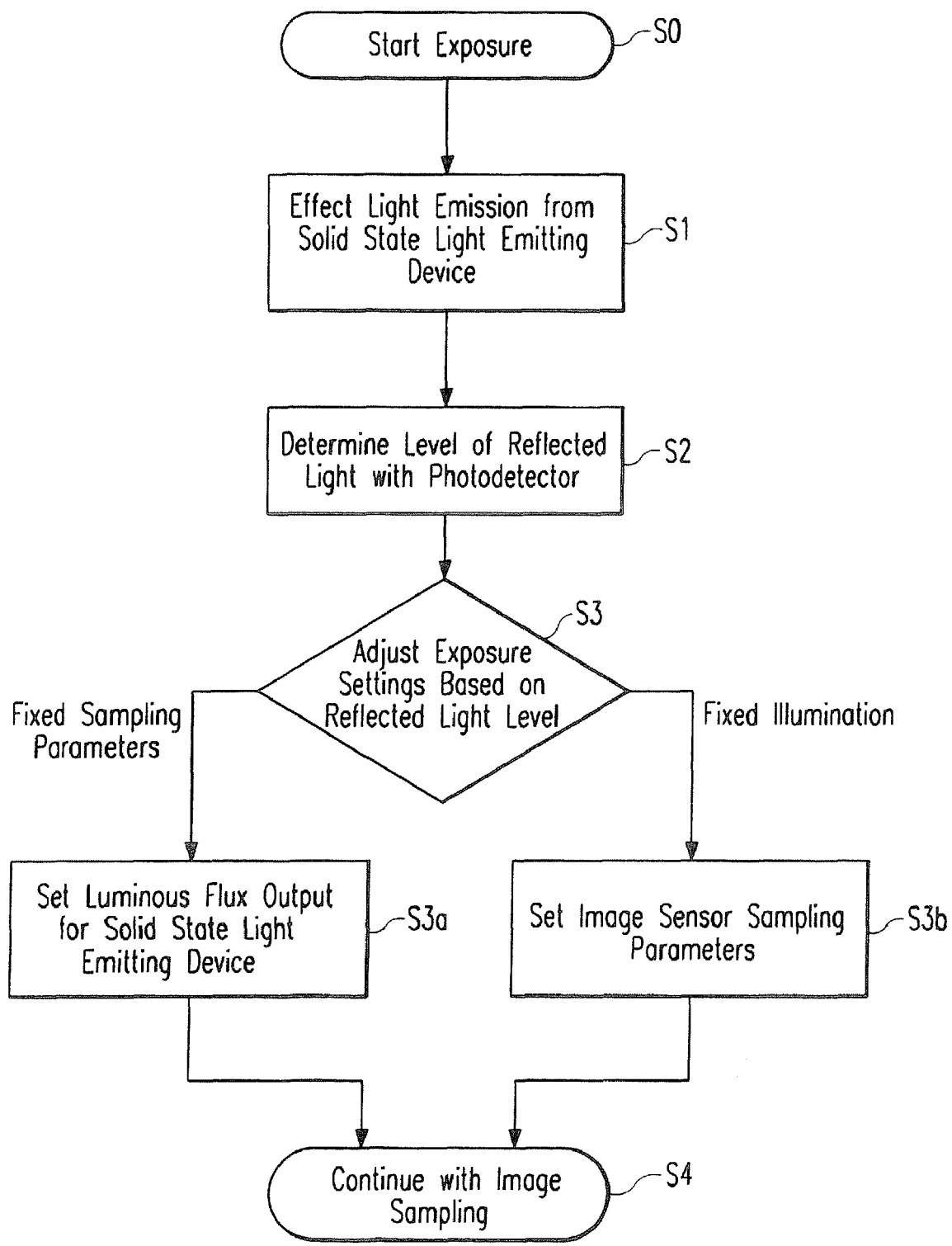
FIG. 6 shows a flowchart with the basic steps of a method according to the invention.

The basic method steps of an exposure control according to the present invention are shown in FIG. 6. When a user starts an exposure to record a picture in step S0, the solid state light emitting device is turned on in step S1 for emitting light of a defined luminous flux. Part of the emitted light is reflected from the pictured scene onto a photodetector enabling a determination of the reflected light level in step S2. The exposure settings for the picture recording are adjusted based on the reflected light level determined in step S3, whereby either the luminous flux output from the solid state light emitting device is set to an appropriate value in sub-step S3a if the image sensor sampling parameters are kept fixed, or the image sensor sampling parameters are adjusted in sub-step 3b if the illumination level from the solid state light emitting device is fixed at a certain level. It should be noted that the illumination level used in sub-step S3b must not necessarily equal the illumination level of step S1 used for determining the reflected light level in step S2. The picture recording is continued with the sampling of the image in step S4.

Step S4 does not have to be performed disjoint from the preceding exposure adjustment, but may also be done simultaneously with it. The emission of light from the solid state light emitting device is preferably controlled in synchronisation with one or more sampling states of the image sensor. In one embodiment, the illumination with the photo flash is effected for the entire time interval required for sampling an image to be recorded, i.e. the flash is started at the beginning of the image sampling and turned off at the end of the image sampling. If a pre-flash is used for determining the exposure settings, the according luminous flux output from the photo flash is triggered by the start of the picture recording.

In alternative embodiment of the method, the photo flash is only lit within a time interval, where all of the image sensor elements are in sampling mode simultaneously.

It should be noted that the control circuit for a solid state photo flash of an image recording apparatus can be implemented completely or in part in analogue as well as in digital technology. A digital component of the control circuit may further comprise a processing means adapted to process instructions of a computer program such that the functions of the control circuit described above are implemented by the processing means executing the instructions of the computer program. The functions are hereby executed in an order, which corresponds to a method of the present invention.

The computer program is preferably stored in a storage means of the image recording apparatus or the appliance housing it, like e.g. an electronic device for wireless communication. It may further be made available separately in form of a computer program product for an image recording apparatus comprising a computer readable medium like a data carrier or a downstream in a network or a wireless data transmission, and a computer program embossed thereon in form of a series of state elements which correspond to the elements of the program instructions.

The invention claimed is:

1. An image recording apparatus comprising:
   an image sensor which, when operable, converts an optical image into image data using image sensor sampling parameters;
   a solid state light emitting device, which, when operable, illuminates a scene being the subject of the optical image;
   a photoelectric converter that is distinct from the image sensor and which, when operable, converts light reflected from the scene illuminated with the solid state light emitting device into a reflected light level signal that represents intensity of light reflected from the scene;
   an exposure control circuit which, when operable, controls one or more exposure settings used for recording an image with the image sensor, the one or more exposure settings comprising at least one illumination setting defining a luminous flux to be emitted by the solid state light emitting device; and
   a drive circuit which, when operable, drives the solid state light emitting device in accordance with the at least one illumination setting provided by the exposure control circuit,
   wherein the exposure control circuit in operation compares the reflected light level signal to a reference signal to selectively adjust the luminous flux that is output by the solid state light emitting device if the reflected light level signal is different from the reference signal, while the solid state light emitting device continues to illuminate the scene and while the image sensor simultaneously performs image sampling.

2. The image recording apparatus of claim 1, wherein the exposure control circuit which, when operable, controls the at least one illumination setting based on a comparison of the reflected light level signal with a reference signal that is generated in response to pre-set image sensor sampling parameters,
   wherein the drive circuit which, when operable, drives the solid state light emitting device to adapt the luminous flux emitted by the solid state light emitting device while the image sensor converts the optical image into the image data using the image sensor sampling parameters.

3. The image recording apparatus of claim 2, wherein the exposure control circuit which, when operable, controls the image sensor sampling parameters based on the value of the reflected light level signal obtained for driving the solid state light emitting device in correspondence to a pre-set illumination setting.

4. The image recording apparatus of claim 1, further comprising a synchronisation circuit which, when operable, enables the drive circuit to synchronize a light emission from the solid state light emitting device with one or more sampling states of the image sensor.

5. The image recording apparatus of claim 4, wherein the synchronisation circuit which, when operable, causes the drive circuit to effect a light emission from the solid state light emitting device for a time period sufficient for the sampling of one image frame to be recorded.

6. The image recording apparatus of claim 4, wherein the synchronisation circuit is configured to have the drive circuit effect a light emission from the solid state light emitting device, wherein the light emission is limited to within a time span corresponding to all image sensing elements of the image sensor being in sampling mode.

7. The image recording apparatus of claim 1, wherein the photoelectric converter comprises a photodiode.

8. The image recording apparatus of claim 1, wherein the photoelectric converter comprises a phototransistor.

9. The image recording apparatus of claim 1, wherein the photoelectric converter comprises a photoresistor.

10. The image recording apparatus of claim 1, wherein the solid state light emitting device comprises a light emitting diode.

11. The image recording apparatus of claim 1, wherein the exposure control circuit comprises a comparator circuit which, when operable, creates a signal that forms the base for the illumination setting and which is based on a difference between the reflected light level signal and the reference signal.

12. The image recording apparatus of claim 1, wherein the exposure control circuit comprises a logic circuit.

13. The image recording apparatus of claim 12, wherein the photoelectric converter comprises an analogue-to-digital converter which, when operable, provides a digital reflected light level signal.

14. A wireless communication device comprising an image recording apparatus according to claim 1.

15. The wireless communication device of claim 14, further comprising a mobile radio terminal.

16. The wireless communication device of claim 14, wherein the image recording apparatus comprises a detachable accessory unit for a main body of the wireless communication device.

17. A method for adjusting an exposure setting for an image recording apparatus having an image sensor configured to convert an optical image into image data and a solid state light emitting device configured to illuminate a scene being the subject of the optical image, wherein the exposure setting comprises at least an illumination setting that defines a luminous flux to be emitted by the solid state light emitting device, the method comprising:
   illuminating the scene with light emitted from the solid state light emitting device;
   measuring an intensity of light reflected from the scene using a photoelectric converter that is distinct from the image sensor;
   comparing the measured intensity of light reflected from the scene to a reference signal; and
   selectively adjusting the luminous flux output of the solid state light emitting device in response to the measured intensity of light reflected from the scene while the solid state light emitting device simultaneously continues to illuminate the scene and while the image sensor simultaneously converts the optical image into the image data,
   wherein the luminous flux output by the solid state light emitting device is adjusted if the measured intensity of light reflected from the scene is different from the reference signal.

18. The method of claim 17, wherein the illumination setting is adjusted by comparing the measured intensity of light reflected from the scene with a reference signal that is generated in response to pre-set image sensor sampling parameters.

19. The method of claim 17, further comprising adjusting the image sensor sampling parameters in response to the measured intensity of light reflected from the scene, which is illuminated by operating the solid state light emitting device at a pre-set illumination setting.

20. The method of claim 17, wherein the emission of light from the solid state light emitting device is synchronized with one or more sampling states of the image sensor.

21. The method of claim 20, wherein emission of light from the solid state light emitting device during image recording is limited to a time period sufficient for the sampling of one image frame to be recorded.

22. The method of claim 20, wherein emission of light from the solid state light emitting device during image recording is limited to within a time span corresponding to all image sensing elements of the image sensor being in sampling mode.

23. A computer program product for adjusting one or more exposure settings for an image recording apparatus, the computer program product comprising a non-transitory computer usable storage medium having computer readable program code means embodied in the medium, the computer readable program code configured to carry out the method of claim 17.

* * * * *